INVENTOR.
WALTER KIDD
BY
ATTORNEYS

INVENTOR.
WALTER KIDD

United States Patent Office 3,473,645
Patented Oct. 21, 1969

3,473,645
SINGLE BAR TRANSFER DEVICE
Walter L. Kidd, Warren, Mich., assignor to F. Jos. Lamb Company, Incorporated, Detroit, Mich., a corporation of Michigan
Filed May 29, 1967, Ser. No. 642,039
Int. Cl. B65g 25/08
U.S. Cl. 198—221                                    15 Claims

ABSTRACT OF THE DISCLOSURE

A mechanism for transferring workpieces through successive stations of an automated machine tool line which includes workpiece supporting rails and a single transfer bar extending along the rails and divided into a plurality of successive sections, each of which have dogs thereon for engaging and advancing the rail supported workpieces when the transfer bar is actuated. The transfer bar sections are rotatably connected with one another about the longitudinal axis of the transfer bar so that the sections can be selectively rotated to locate the dogs thereon in either work-engaging or work-bypassing position.

---

This invention relates to a transfer device of the type utilized for transferring workpieces through successive stations on an automated line. The invention generally comprises a longitudinally reciprocable transfer bar made up of a plurality of successive stations having work-engaging dogs thereon which are selectively operable to engage or bypass rail supported workpieces when the transfer bar is reciprocated. The successive stations are arranged along the path of travel of the transfer bar in successive groups and the transfer bar is designed so that the workpieces in some groups of stations can be transferred through a distance which is a multiple of the transfer distances of workpieces in other groups. Between the successive groups of stations where machining operations are performed on the workpiece idle stations are provided where the workpieces simply accumulate or de-accumulate.

It frequently happens that some machining operations in an automated machine tool line require considerably more time for completion than other operations in the same line. Under these circumstances, it is not uncommon to delay advancement of all the workpieces from one station to the next until a sufficient time has elapsed to complete the machining operation which requires the longest time interval. Such an arrangement is inefficient from the standpoint of allowing workpieces to remain at a work station for a considerably longer period of time than is necessary to complete the machining operation of shorter duration at that work station.

The present invention has for its object the provision of an improved transfer mechanism designed such that workpieces located at work stations which require a short time interval to complete the machining operation are moved to the next successive station at a time when other workpieces at work stations are still being subjected to a machining operation which requires substantially more time.

A further object of the present invention resides in the provision of a transfer mechanism having a single reciprocable transfer bar designed to transfer workpieces between two successive groups of stations through a single transfer distance and to transfer workpieces through a different group of successive stations through a distance equal to a multiple of the single transfer distance.

More specifically, the present invention is directed to a transfer mechanism for an automated machine line which incorporates a group of idle stations between a first group of work stations which require a relatively short time to complete the machining operation and a second group of work stations which require a relatively longer period of time to complete the machining operation. In the arrangement of the present invention the workpieces are transferred selectively through either a single or multiple transfer distance but utilizing a single transfer bar which is composed of a plurality of adjacent sections. Each section of the transfer bar is provided with a series of work-engaging members that are selectively operable on the advance stroke of the transfer bar to either engage or bypass the workpieces at the stations adjacent the work-engaging members. The transfer mechanism includes suitably located switches for signaling the circuitry controlling the work-engaging members and the transfer bar drive to present the proper sequence of transfer bar operation.

Other features and objects of the present invention will become apparent from the following description and drawings in which.

Referring to FIGS. 1 through 6, the present invention is illustrated in connection with an automated machine line which includes a plurality of stations 10 extending along a straight line and designated successively by numerals 1 through 13. These stations are divided into a series of successive groups. In the arrangements illustrated stations 1 and 2 comprise group A; stations 3 and 4 comprise group B; stations 5, 6, 7 and 8 comprise group C; stations 9 and 10 comprise group D and stations 11, 12 and 13 comprise group E. Machine tools 12 are located at each of the stations of groups A, C and E for performing machining operations on the workpieces located at these stations. Prior to station 1 a load station 14 may be provided and following station 13 an unload station 16 may be provided.

In the particular arrangement illustrated at each of the stations in groups A and E the workpieces are subjected to a machining operation of relatively short duration. At the stations of group C the workpieces are subjected to a machining operation of relatively long duration. The stations of groups B and D are idle stations. As will be explained more fully hereinafter, workpieces are transferred one at a time through the stations in group A and to the stations in group B. When workpieces are present at both stations 3 and 4, these workpieces are advanced to stations 5 and 6, respectively; the workpieces at stations 5 and 6 are advanced to stations 7 and 8, respectively and the workpieces at stations 7 and 8 are advanced to stations 9 and 10, respectively.

Figure 7:
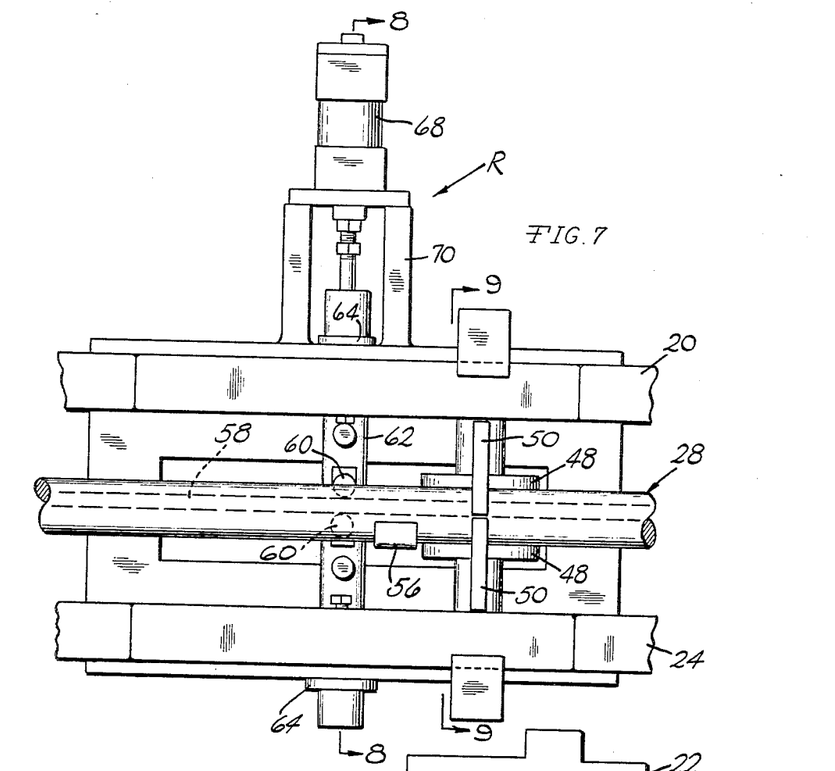
FIGURE 7 is a plan view of a portion of the transfer mechanism adjacent one of the stations.
Figure 8:
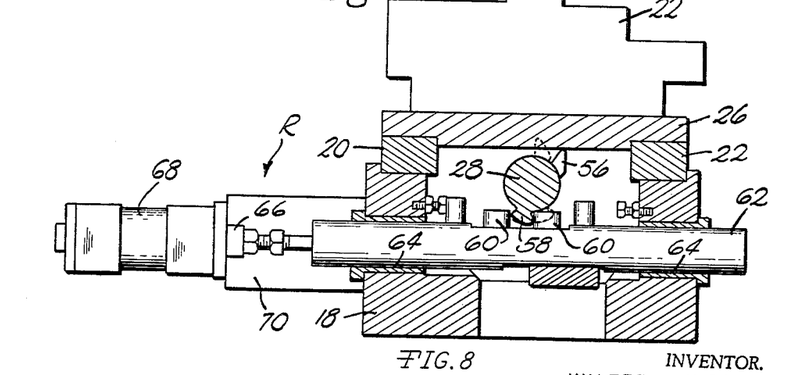
FIGURE 8 is a sectional view along the line 8—8 in FIG. 7.
Figure 9:
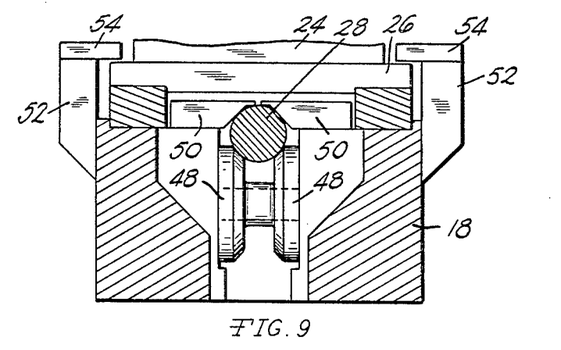
FIGURE 9 is a sectional view along the line 9—9 in FIG. 7.

At each station there is arranged a base 18 which supports a pair of transfer rails 20, 22 which extend continuously from load station 14 to unload station 16 (FIGS. 7 and 8). In the illustrated embodiment, the workpieces, which are designated 24, are supported on pallets 26 slidably arranged on rails 20, 22. Means, not illustrated, are provided for securely and fixedly mounting workpieces 24 on pallets 26. Likewise there is provided at each station a clamp mechanism, not illustrated, for clamping the pallets 26 at a predetermined fixed location at each work station before the machining operation at that station is initiated. The provision of such clamping mechanism is conventional in this art and, since it forms no part of the present invention, it is not illustrated.

The means for transferring workpieces between successive stations comprises a reciprocable transfer bar 28 located between rails 20, 22 and extending the full length thereof. The drive mechanism for reciprocating transfer bar 28 is generally designated 30. Transfer bar 28 comprises a series of interconnected sections. When transfer bar 28 is in the retracted position shown in FIG. 1, the first section of the transfer bar, designated A′, spans the load station 14 and stations 1 and 2; the second section of the transfer bar, designated B′, spans stations 3 and 4; the third section of the transfer bar, designated C′, spans stations 5, 6, 7 and 8; the fourth section of the transfer bar, designated D′, spans stations 9, 10, 11, 12 and 13 and the fifth section of the transfer bar, designated 32, extends from the end of section D′ to the drive mechanism 30.

Figures 12, 13:
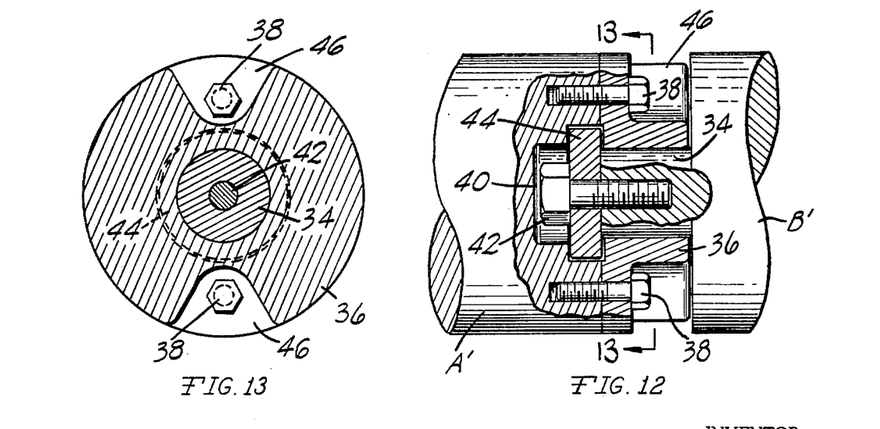
FIGURE 12 is a fragmentary view, with parts broken away, showing the connection between adjacent sections of the transfer bar.
FIGURE 13 is a sectional view along the line 13—13 in FIG. 12.

The successive sections of the transfer bar are interconnected for relative rotation by the arrangement illustrated in FIGS. 12 and 13. The connections between the successive sections of transfer bar 28 are all the same. In FIGS. 12 and 13 the connection between sections A′ and B′ is illustrated. Section B′ of the transfer bar is provided with a central axially projecting stud portion 34 at its end which extends into a centrally apertured bushing 36 secured to the adjacent end of section A′ by screws 38. The end of section A′ is fashioned with a central socket 40 for accommodating the head of a screw 42 which threads into stud portion 34 and clamps a washer 44 against the inner face of bushing 36 to interconnect the sections A′ and B′. Bushing 36 is fashioned with diametrically opposed recesses 46 at its outer periphery to accommodate a wrench or similar turning tool for enabling the screws 38 to be driven into the end of section A′ after bushing 36 is rotatably secured on stud portion 34 by screw 42 and washer 44.

Transfer bar 28 is supported on each base 18 for reciprocation by a plurality of pairs of support and guide rollers 48. On each base 18 directly above the pairs of rollers 48 are mounted hold down straps 50 for retaining the transfer bar 28 between and on rollers 48. If desired, each base may also be provided with hold downs 52 having inwardly directed flanges 54 which overlie the lateral edges of pallets 26.

At each of the stations the successive transfer bar sections are provided with pallet-engaging dogs 56 fixed thereon, the dogs being spaced apart in accordance with the spacing between successive stations so that the dogs 56 are adapted to engage the pallets at the successive stations and advance them when the transfer bar is reciprocated through the advance stroke. However, as described above, each of the transfer bar sections are interconnected for rotation relative to the adjacently connected transfer bar sections. The mechanism for rotating the transfer bar sections are all the same and are generally designated R. Each transfer bar section is provided with a rib 58 extending lengthwise on the lower side thereof. Rib 58 is engaged by a pair of rollers 60 on a transverse slide 62 slidably arranged in bushings 64 on its respective base 18. Slide 62 is interconnected with the piston rod 66 associated with a hydraulic cylinder 68 mounted at one side of its respective base 18 by a support bracket structure 70. The cylinder for rotating section A′ of the transfer bar is designated 68A; the cylinder for rotating section B′ of the transfer bar is designated 68B; the cylinder for rotating section C′ of the transfer bar is designated 68C and the cylinder for rotating section D′ of the transfer bar is designated 68D.

Figure 1:
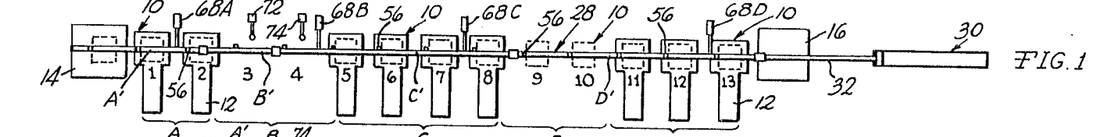
FIGURES 1 through 6 are diagrammatic views of the successive operating cycles of the transfer mechanism of the present invention.
Figure 2:
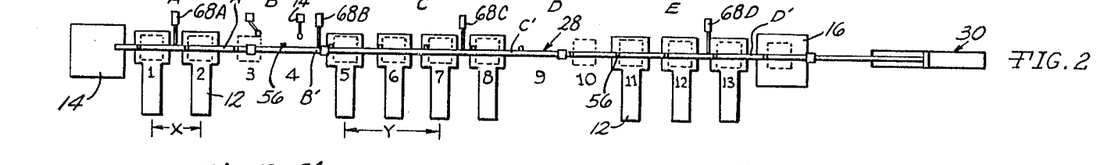

Referring to FIG. 1, at station 3 there is arranged a pallet present switch 72 and at station 4 there is arranged a pallet present switch 74. Switches 72 and 74 are adapted to be tripped by workpieces when the latter are present at these respective stations.

Figure 10:
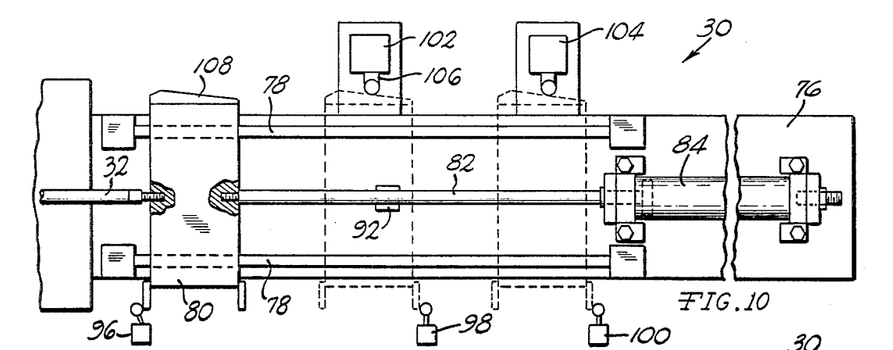
FIGURE 10 is a plan view of the drive arrangement for the transfer bar.
Figure 11:
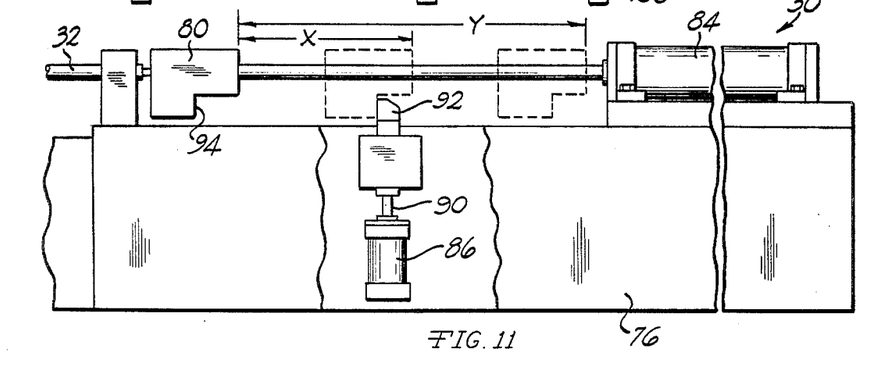
FIGURE 11 is a side elevational view of the drive mechanism for the transfer bar.

Referring now to FIGS. 10 and 11, the drive mechanism for the transfer bar, generally designated 30, is there illustrated. This drive mechanism includes a base 76 on which a pair of laterally spaced guide bars 78 are mounted. A carriage 80 is slidably arranged on guide bars 78. At one side thereof carriage 80 is connected with section 32 of transfer bar 28 and at the opposite side thereof carriage 80 is connected to the piston rod 82 of a hydraulic cylinder 84 mounted on base 76. At generally the central portion of base 76 there is arranged a hydraulic cylinder 86 having a vertically upwardly extending piston rod 90 which is adapted to vertically reciprocate a carriage stop 92. Carriage 80 is formed with a shoulder 94 on the underside thereof which is adapted to abut against stop 92 when the latter is in the raised position to limit travel of carriage 80 in the direction towards the right as viewed in FIG. 11, this direction being the advance stroke of the transfer bar. When stop 92 is operative, carriage 80 and transfer bar 28 travel through stroke X and when stop 92 is retracted, the carriage and transfer bar travel through stroke Y. The length of stroke Y is twice the length of stroke X. Stroke X corresponds to the distance between successive stations 10 and stroke Y corresponds to the distance between alternate stations (see FIG. 2).

Three limit switches 96, 98 and 100 are mounted on base 76 and are adapted to be tripped by carriage 80. Switch 96 is tripped by the carriage when it returns to the fully retracted position shown in full lines in FIG. 10. Switch 98 is tripped by the carriage at the end of its advance stroke X when the carriage engages stop 92. Switch 100 is stripped by the carriage at the end of its advance stroke Y. There is also mounted on base 76 a pair of deceleration valves 102 and 104 each having an actuator 106 adapted to engage a cam 108 on the side of carriage 80. Valves 102 and 104 control the operation of a hydraulic cylinder 84 so that the carriage decelerates in the proper manner as it approaches the end of its strokes. When stop 92 is in the retracted position, valve 102 and switch 98 are rendered inoperative.

The operation of the transfer mechanism of this invention is best understood upon reference to FIGS. 1 through 6 and 14. In FIG. 1 the transfer bar 28 is shown in the retracted position with workpieces present at the stations of groups A, C, D and E. When transfer bar 28 returns to its fully retracted position (FIG. 1), switch 96 is tripped by carriage 80. When switch 96 is tripped, it conditions the circuitry for proper actuation of the transfer bar rotate mechanisms R through pallet present switches 72, 74. When neither switch 72 nor 74 is tripped and the transfer bar is fully retracted, the electrical circuitry actuates cylinders 68A and 68D to rotate the sections A′ and D′ of transfer bar 28 to the position shown in broken lines in FIG. 8 wherein the dogs 56 on these sections of the transfer bar are in the work-engaging position (broken line showing in FIG. 8). The circuits controlled by switches 72 and 74 are also designed such that as long as switch 74 remains untripped, stop 92 remains in the raised position. This is the position in which the transfer mechanism is illustrated in FIG. 1.

After the machining operations are completed at stations A and E and the cutting tools are retracted from the workpieces, the control circuitry transmits a signal to the drive mechanism 30 to advance the transfer bar. At this time dogs 56 on only sections A' and D' are in the work-engaging position and the only pallets that will be advanced are those at stations 1, 2, 9, 10, 11, 12 and 13. Since the advance stroke of carriage 80 is limited by stop 92, each of the pallets at these stations will be advanced to the next successive station and the workpieces at stations 5, 6, 7 and 8 will remain at these stations where the machining operation of longer duration continues without interruption. The workpiece at load station 14 will be advanced to station 1 and the workpiece at station 13 will be advanced to unload station 16. This is the position of the transfer mechanism illustrated in FIG. 2.

Figure 14:
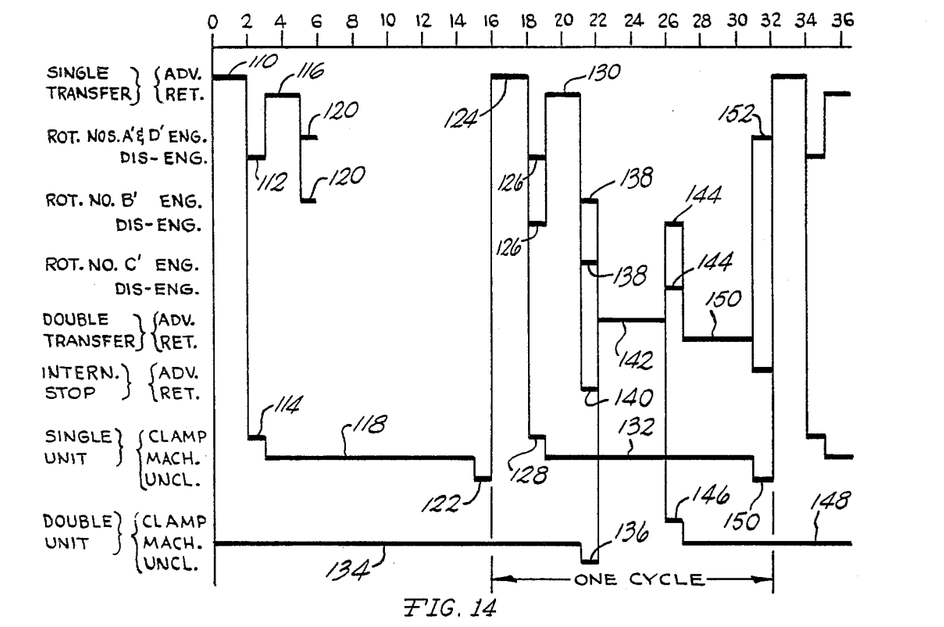
FIGURE 14 is a cycle diagram showing the sequence of operation of the various elements of the transfer mechanism.

The advance stroke X of the cycle of the transfer mechanism is illustrated at 110 in FIG. 14. FIG. 14 represents a typical cycle of operation of the mechanism wherein the numerals across the top of this figure represent seconds of elapsed time and the designations at the left of this figure represent the actual operations performed by the various components of the transfer mechanism.

When transfer bar 28 reaches the end of its advance stroke X, carraige 80 trips switch 98 (FIG. 10) and switch 98 actuates the rotate mechanisms R so that each section of the transfer bar is rotated to the full line position indicated in FIG. 8 wherein all the dogs 56 are in the pallet-bypassing position. The retraction of dogs 56 is indicated at 112 in FIG. 14. At the same time all the clamping mechanisms (not illustrated) at the stations to which workpieces have been advanced are actuated to clamp the pallets in the predetermined fixed position. This is indicated at 114 in FIG. 14. After all the dogs 56 are shifted to the bypassing position and the clamping mechanisms are operated, the stroke of carriage 80 is reversed to retract the transfer bar and the machining cycle at the stations of groups A and E is initiated. The retrac stroke of the transfer bar is designated 116 in FIG. 14 and the machining cycle is designated 118.

Figure 3:
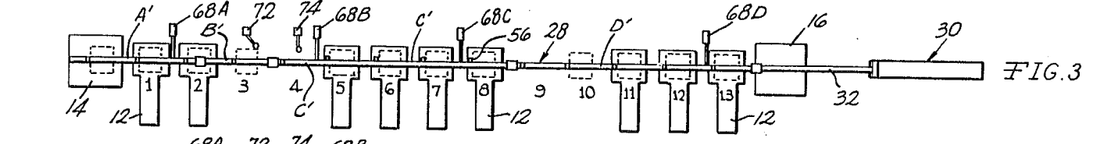
Figure 4:
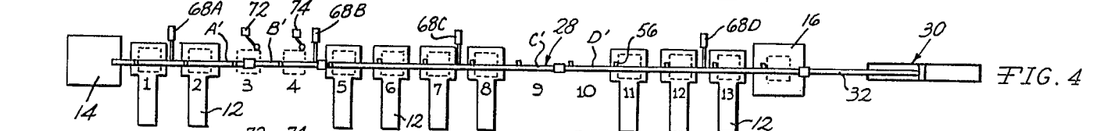
Figure 5:
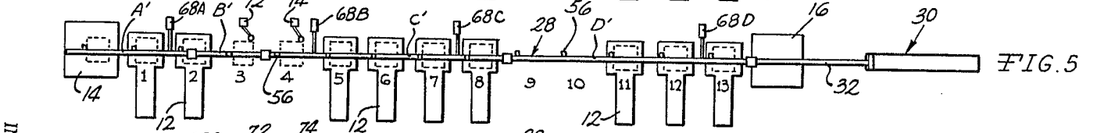

When the transfer bar reaches its fully retracted position (FIG. 11), carriage 80 trips switch 96 and again conditions the transfer bar through switches 72, 74 for its next advance stroke. At this time a workpiece is present at station 3 but not at station 4 and the control circuitry through tripped switch 72 is such that the rotate mechanisms R for sections A', B' and D' of the transfer bar are actuated to shift the dogs 56 at stations 1 through 4 and 9 through 13 to the work-engaging position. The engagement of these rotate mechanisms is designated 120 in FIG. 14. This condition of the transfer mechanism is illustrated in FIG. 3.

After the machining operations on the workpieces at the stations of groups A and E are completed (end of line 118 in FIG. 14), the clamping mechanisms at all of the stations, except 5 through 8, are released. This operation is designated 122 in FIG. 14. Thereafter transfer bar 28 is again advanced as indicated at 124 so that the workpieces at the stations of groups A, B, D and E are all advanced to the next successive station. Thus workpieces are present at stations 1, 2, 3, 4, 11, 12 and 13. Since the rotate mechanism for section C' of the transfer bar was not rotated to the engaged position, the workpieces remain at stations 5, 6, 7 and 8 and the machining operation at these stations continues. This is the condition of the transfer mechanism illustrated in FIG. 4.

When the transfer bar reaches the end of its advance stroke X, switch 98 is again tripped and the rotate-mechanisms are again actuated to shift the dogs 56 of sections A', B' and D' of the transfer bar back to the bypassing position. At the same time the clamp mechanisms are actuated to clamp the pallets in position at stations 1 through 4 and 11 through 13. Retraction of the dogs 56 is designated 126 in FIG. 14 and actuation of the clamp is designated 128. After the dogs are retracted the transfer bar 28 returns to its retracted position (designated 130 in FIG. 14) and the machining cycle is again initiated at the stations of groups A and E as designated at 132 in FIG. 14. At this time workpieces are present at both stations 3 and 4 so that switches 72 and 74 are both tripped.

When the transfer bar reaches its fully retracted position, switch 96 is again tripped and this conditions the circuitry through tripped switches 72 and 74 to rotate dogs 56 on sections B' and C' of the transfer bar to the work-engaging position. The tripping of switch 74 also causes stop 92 to retract. This is the condition of the system illustrated in FIG. 5. In the meantime the machining cycle at the stations of group C, designated 134 in FIG. 14, is completed and the clamps at these stations are disengaged as indicated at 136. In FIG. 14 the engagement of the rotate mechanisms for sections B' and C' of the transfer bar is designated 138 and retraction of the stop 92 is designated 140.

Figure 6:
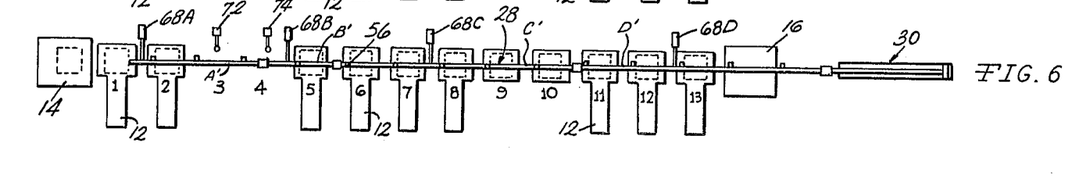

Transfer bar 28 then advances through its stroke Y as indicated at 142 in FIG. 14. The advance stroke of the transfer bar causes the workpieces at stations of groups B and C to advance two stations. This is permissible because identical machining operations are performed at stations 5 and 6 and identical machining operations are performed at stations 7 and 8. Thus workpieces at stations 7 and 8 are advanced to stations 9 and 10, respectively; workpieces at stations 5 and 6 are advanced to stations 7 and 8, respectively and workpieces at idle stations 3 and 4 are advanced to stations 5 and 6, respectively. This condition of the transfer mechanism is illustrated in FIG. 6. It will be apparent that if only a single machining operation of long duration were required stations 7 and 8 would be eliminated from group C. On the other hand if three machining operations of long duration were required, group C would be expanded to six stations instead of four.

Upon completion of the advance stroke Y carriage 80 trips switch 100 and the latter actuates the rotate mechanisms for sections B' and C' of the transfer bar to shift the dogs 56 thereon to the disengaged position. Disengagement of these dogs is designated 144 in FIG. 14. At the same time the dogs are disengaged, the clamp mechanisms at the stations of group C are actuated to clamp the pallets at stations 5, 6, 7 and 8 in the predetermined fixed location to be operated on by the machine tools at these stations. Actuation of the clamps is designated at 146 in FIG. 14. After the pallets at stations 5 through 8 are clamped in position the machining operation is again initiated at these stations. This is designated at 148 in FIG. 14. At the same time, since all the dogs are disengaged, the transfer bar is retracted as designated at 150 in FIG. 14.

When the transfer bar reaches the end of its retraction stroke, switch 96 is again tripped to condition the rotate mechanisms for the next advance stroke of the transfer bar and thus place the entire mechanism in the condition illustrated in FIG. 1. More specifically, at the end of the retraction stroke of the transfer bar, the machining operations at the stations of groups A and E are completed so that the clamping mechanisms at these stations can be actuated to release the pallets, designated 150 in FIG. 14, and the rotate mechanisms for sections A' and D' of the transfer bar are actuated to shift the dogs 56 thereon to the engaged position. This is designated 152 in FIG. 14. Since upon completion of the retraction stroke there is no workpiece at station 4, switch 74 is not tripped and, therefore, cylinder 86 is actuated to project stop 92 to its elevated position so that upon the next advance stroke of the transfer bar the transfer distance will be the stroke X.

Figure 15:
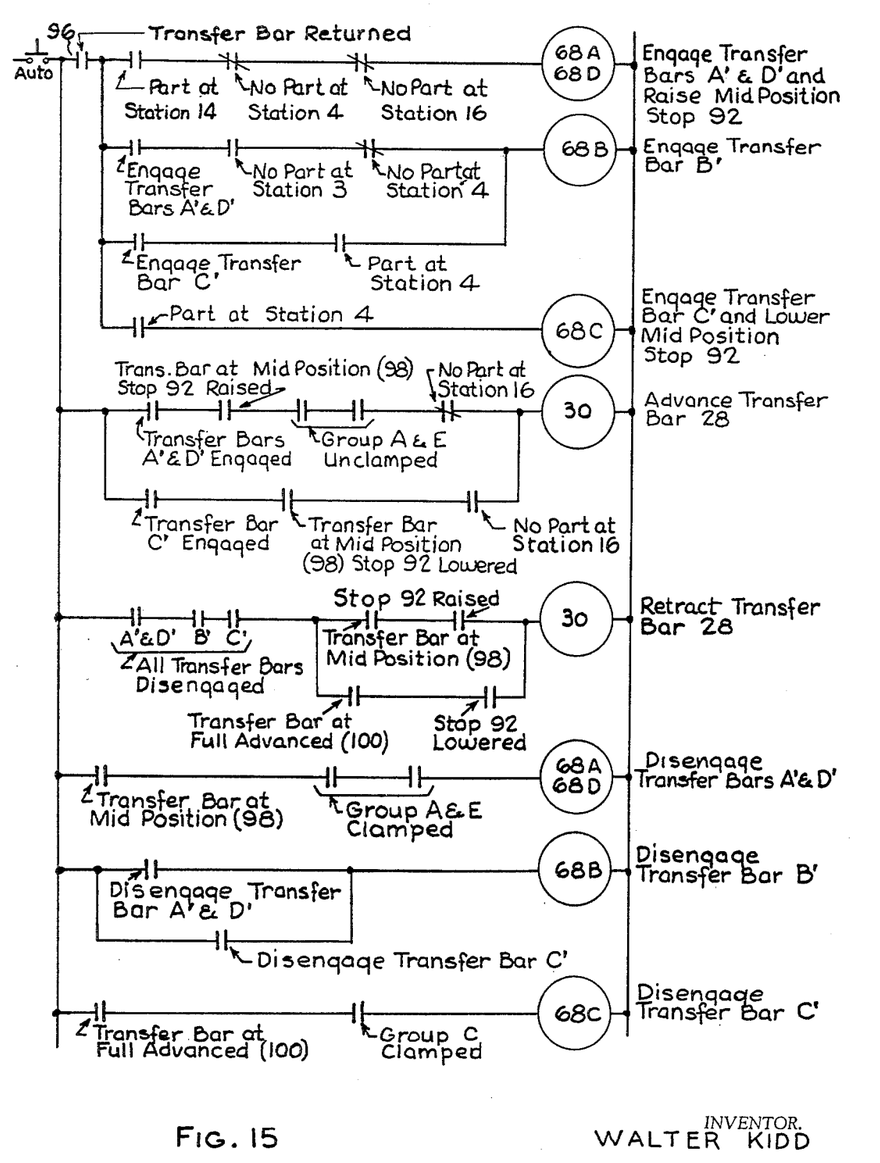
FIGURE 15 is a schematic showing of the electrical logic circuitry employed for actuating the transfer mechanism.

In FIG. 15 there is illustrated in a schematic way the electrical logic circuitry for actuating cylinders 68A, 68B, 68C and 68D for rotating the associated sections A', B', C' and D' of the transfer bar to the engaged and disengaged positions and also for advancing and retracting transfer bar 28. In this figure the cycle start button is designated 154. As shown in FIG. 15, the logic circuitry for the system includes a pair of contacts which are controlled by limit switch 96 for indicating that the transfer bar is in the retracted position. Likewise, contacts are also shown for designating the condition of the pallet present switches at the various stations and the various stops in the mechanism. For example, as indicated at the top of FIG. 15, in order to actuate cylinders 68A and 68D to rotate transfer bar sections A' and D' to the pallet engaging position and to raise stop 92 it is necessary that switch 96 is actuated by carriage 80, that a part be located at load station 14 and that no parts or workpieces are located at stations 4 and 16. The circuit diagram also shows that in order to actuate cylinder 68B to rotate transfer bar section B' to the engaged position it is necessary that limit switch 96 be actuated and that at least one of two conditions exist. One condition is that a command is received to rotate transfer bar sections A' and D' to the engaged position, that a part be located at station 3 and that no part be located at station 4. The other condition under which section B' will be rotated to the engaged position of dogs 56 is that a command is received to rotate transfer bar section C' to the engaged position and that a part is located at station 4. Likewise, in order to rotate transfer bar section C' to the engaged position and to lower stop 92 it is essential that limit switch 96 be actuated and that a part be located at station 4.

The circuitry in FIG. 15 also shows that the drive mechanism 30 is actuated to advance the transfer bar when either of two sets of conditions exist. One set of conditions is the following: transfer bar sections A' and D' are engaged, the mid position switch 98 is actuated and stop 92 is raised, the work-engaging clamps at the stations in groups A and E are unclamped and no part is located at station 16. The other set of conditions which may exist for advancing transfer bar 28 are the following: transfer bar section C' is engaged, switch 98 is actuated and stop 92 is lowered and the work-engaging clamps at the stations of group C are in the unclamped condition.

The circuit in FIG. 15 also shows that retracting the transfer bar first of all requires that all the transfer bar sections are in disengaged position and also that either one of two sets of conditions exist. Either the transfer bar must be at its mid position wherein switch 98 is tripped and stop 92 is raised or the transfer bar must be at the fully advanced position wherein switch 100 is tripped and stop 92 is lowered.

Still referring to FIG. 15, in order to actuate cylinders 68A and 68D to rotate transfer bar sections A' and D' to the disengaged position the transfer bar must be at the mid position wherein switch 98 is tripped and the work-engaging clamps at the stations of groups A and E must be in the clamped condition. Likewise, to shift transfer bar section B' to the disengaged position by actuating cylinder 68B a command must be received to disengage either transfer bar sections A' and D' or to disengage transfer bar section C'. Finally, as illustrated in FIG. 15, in order to actuate cylinder 68C to rotate transfer bar section C' to the disengaged position it is essential that the transfer bar be in the fully advanced position tripping switch 100 and that the work-engaging clamps at the stations of group C be in the clamped condition.

I claim:

1. In a transfer member of the type having a plurality of regularly spaced successive stations arranged in a regular path and divided into successive groups the combination comprising, a single reciprocable transfer member extending along said group of stations, said transfer member comprising a plurality of sections, one for each group of said stations, means interconnecting the adjacent sections of the transfer member so that each section can rotate about the longitudinal axis of the transfer member relative to and independently of the other sections, a plurality of individual work-engaging means on said transfer member sections and movable therewith so that when the transfer member is displaced in one direction through a predetermined stroke all of said work-engaging means are simultaneously displaced in said one direction through a distance corresponding to the stroke of the transfer member, said work-engaging means being adapted to engage workpieces at said stations and advance them to a successive station when the transfer member is displaced, the work-engaging means on said sections forming groups corresponding generally to said groups of stations and means for selectively actuating the work-engaging means on each section to a work-engaging and a work-bypassing position so that when the transfer member is displaced in one direction, although all the work-engaging means are correspondingly displaced, the workpieces at only preselected groups of stations where the work-engaging means are actuated to the work-engaging position are advanced.

2. The combination set forth in claim 1 including means for controlling the displacement of the said transfer member to one stroke corresponding to the distance between successive stations and to a second stroke corresponding to a multiple of said distance between successive stations.

3. The combination set forth in claim 2 wherein the means for selectively actuating the work-engaging means include means for detecting the presence of a workpiece at selected ones of said stations.

4. The combination set forth in claim 2 wherein said means for controlling the displacement of said transfer member include means for detecting the presence of a workpiece at one of said stations.

5. The combination set forth in claim 1 wherein said work-engaging means comprise abutments mounted on said bar sections and rotatable therewith to said work-engaging and work-bypassing positions.

6. The combination set forth in claim 2 wherein the means for reciprocating the transfer member comprises fluid cylinder means driving a reciprocable member operably connected with said transfer member, said means for controlling the displacement of the transfer member comprising abutment means which are adapted to be projected into and out of the path of travel of the reciprocating member intermediate the ends of the stroke of the fluid cylinder means.

7. A workpiece transfer mechanism comprising a series of stations extending in a regular path and divided into at least three groups, the first group of stations comprising at least one station at which workpieces are adapted to remain for a predetermined unit of time, the second group of stations comprising a series of stations at which workpieces are adapted to remain at the stations therein for a period of time equal to a whole multiple of said unit of time, the number of stations in the second group being equal to at least said multiple, the third group of stations comprising a plurality of stations equal in number to at least said multiple, said third group of stations being located immediately between the first and second group, means at the stations of the first and second groups for performing an operation on the workpieces at said stations, the third group of stations comprising idle stations, a single reciprocable transfer member extending along said three groups of stations, said transfer member being divided into three successive sections which, in the retracted position of the transfer member, are generally juxtaposed respectively to said three groups of stations, means interconnecting the adjacent sections of said transfer member so that each section can rotate about the longitudinal axis of the transfer member relative to and independently of the other sections, each transfer member section having work-engaging means thereon which correspond in number and spacing with the number and spacing of the stations in the group to which the section is juxtaposed, means for reciprocating the transfer member through advance and retraction strokes, means for actuating the reciprocating means to produce a stroke of the transfer member which corresponds to either the distance between successive stations in the third group or to said multiple of said distance and means for selectively actuating the work-engaging means on each individual section of the transfer member to either work-engaging or work-bypassing position.

8. A transfer mechanism as called for in claim 7 wherein the transfer member comprises a transfer bar extending longitudinally along said groups of stations.

9. The combination called for in claim 8 wherein the work-engaging means comprise dogs on said transfer bar sections.

10. The combination set forth in claim 9 wherein said dogs are fixed to said transfer bar sections and said transfer bar sections are rotatable to shift the dogs to the work-engaging and work-bypassing position.

11. The combination set forth in claim 10 including means for conditioning the actuating means for the reciprocation means and the work-engaging members to advance workpieces one at a time through the first group of stations and from the first group into the third group of stations and in groups of said multiple from the third group of stations to the second group of stations.

12. The combination set forth in claim 11 wherein said conditioning means include means for detecting the presence of workpieces at the stations of the third group.

13. The combination set forth in claim 12 wherein said detecting means are adapted to shift the dogs on the first section of the transfer bar to work-engaging position in response to absence of workpieces at all the stations of the third group, to shift the dogs on the first and third sections of the transfer bar to work-engaging position when workpieces are present at some but not all of the stations of the third group and to shift the dogs on the third and second sections of the transfer bar when workpieces are present at all of the stations of the third group.

14. The combination set forth in claim 13 wherein said detecting means are adapted to actuate the reciprocating means to produce said multiple stroke when workpieces are present at all of the stations of the third group and to produce said single transfer stroke when workpieces are present at less than all of the stations of the third group.

15. The combination set forth in claim 14 including means responsive to completion of the advance stroke of the transfer bar to shift all of the dogs to the work-bypassing position.

References Cited

UNITED STATES PATENTS 3,301,374  12/1967  Proctor ____________ 198—221

RICHARD E. AEGERTER, Primary Examiner

PO-1050
(5/69)

UNITED STATES PATENT OFFICE
CERTIFICATE OF CORRECTION

Patent No. 3,473,645          Dated October 21, 1969

Inventor(s) KIDD, Walter D.

It is certified that error appears in the above-identified patent and that said Letters Patent are hereby corrected as shown below:

Column 8, Line 50, after "multiple" insert -- (greater than 1) --

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents